United States Patent [19]

Nelson et al.

[11] 4,046,531
[45] Sept. 6, 1977

[54] REFRIGERATION LOAD SHEDDING CONTROL DEVICE

[75] Inventors: Lorne W. Nelson, Bloomington; David J. Sutton, Minneapolis, both of Minn.

[73] Assignee: Honeywell Inc., Minneapolis, Minn.

[21] Appl. No.: 704,880

[22] Filed: July 14, 1976

[51] Int. Cl.² .................................... G05D 23/30
[52] U.S. Cl. ...................... 62/202; 236/68 B; 307/117
[58] Field of Search .............. 236/68 B; 62/202, 157; 307/140, 117

[56] References Cited

U.S. PATENT DOCUMENTS

| | | | |
|---|---|---|---|
| 3,261,992 | 7/1966 | Coe | 307/117 |
| 3,284,002 | 11/1966 | Edelman et al. | 236/68 B |
| 3,623,545 | 11/1971 | Pinckaers | 236/68 B |
| 3,925,680 | 12/1975 | Dixon | 307/140 |

*Primary Examiner*—William E. Wayner
*Assistant Examiner*—Robert Charvat
*Attorney, Agent, or Firm*—Clyde C. Blinn; Henry L. Hanson

[57] ABSTRACT

A load shedding control device, for reducing the electrical energy demand of an electrical load apparatus having a load depending upon ambient temperature, having an ambient temperature responsive switch adapted to be connected in a control system of the electrical load apparatus for reducing the use of electrical energy by the electrical load apparatus as the ambient temperature increases. The ambient temperature responsive switch has its control temperature reset by an artificial heater energized proportionally to the percent of operating time of electrical load apparatus, whereby as the desired operating time of the load apparatus increases, the actual operating time is reduced to conserve electrical energy.

3 Claims, 3 Drawing Figures

4,046,531

REFRIGERATION LOAD SHEDDING CONTROL DEVICE

BACKGROUND AND SUMMARY OF THE INVENTION

Electric utility companies need to provide and maintain generating facilities and distribution networks which are ample by a safe margin to meet the demand for electric power during periods of peak or maximum demand. Such requirements are needed to maintain their competitive position as suppliers of energy as well as meeting certain governmental regulations. The level of electrical power consumed during other than these peak periods is considerably less than the peak demand; however, to meet the peak demand a considerable investment in generating facilities and distribution networks is needed and yet during a good portion of the time such generating facilities may be idle. To eliminate the investment of several hundred thousand dollars for extra capacity to meet these peak demands, various systems have been used in the past to reduce the demand for electrical energy during the peak periods.

For example, in the control of electric water heaters, timing mechanisms, and even elaborate signaling systems for controlling electric water heaters over the power line by superimposed control signals, have been devised for disconnecting electrical loads during a peak period to reduce the peak demand. Another type of system, such as that shown in the Robert L. Coe U.S. Pat. No. 3,261,992, patented July 19, 1966, is used for selectively disconnecting an electrical refrigeration apparatus when the outdoor temperature exceeds some predetermined value to decrease the peak electrical demand. Another device is shown in a co-pending application of Lorne W. Nelson, Ser. No. 705,214, filed July 14, 1976, entitled REFRIGERATION LOAD SHEDDING CONTROL DEVICE.

The present invention is an improvement to the device of the Lorne W. Nelson application wherein a device for use with the electrical load apparatus has an outdoor temperature responsive switch means connected in the control circuit and the temperature responsive portion of the outdoor temperature responsive switch means is artifically heated by a heater which is energized each time the electrical load apparatus is energized for operation.

The invention is described in the drawing in which

Figure 1:
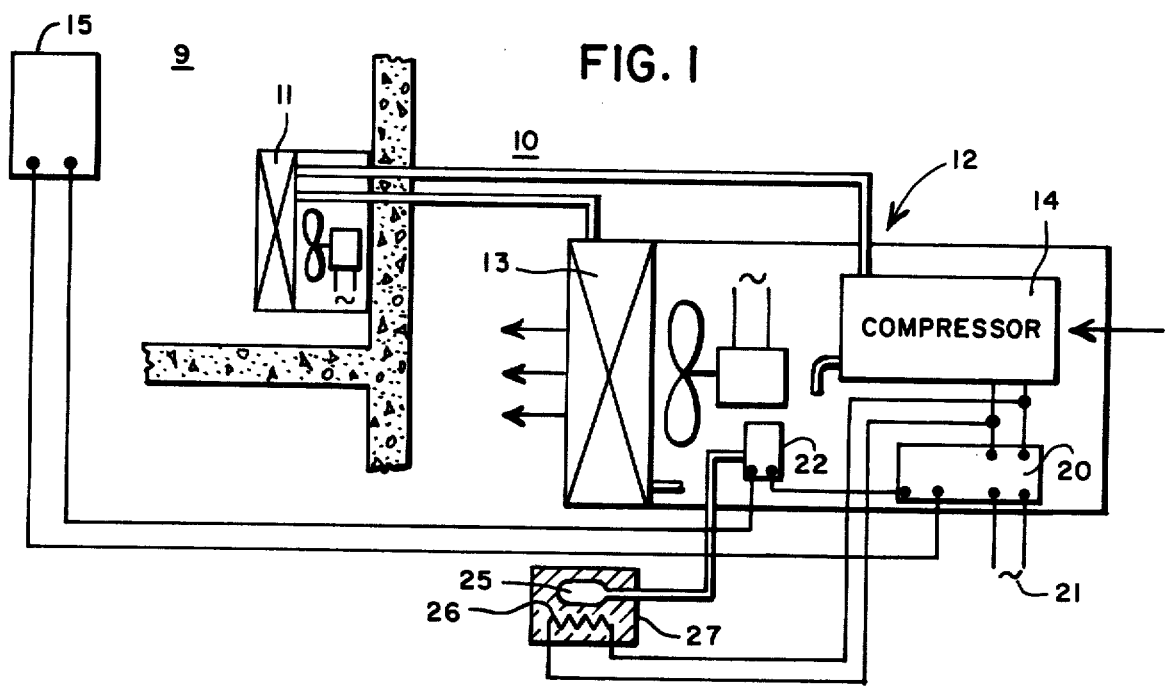
FIG. 1 is a schematic drawing of a typical electrical load apparatus such as a refrigeration apparatus for a domestic dwelling.

Referring to FIG. 1, a dwelling or space 9 is being conditioned or cooled by an electrical load apparatus or a conventional refrigeration system 10. An evaporator 11 is connected to a refrigeration apparatus 12 comprising a condenser and a motor driven compressor 14. The refrigeration system is controlled to maintain the condition or temperature of the air in space 9 at some predetermined value as controlled by a room thermostat 15. Thermostat 15 is connected in an electrical control circuit comprising a control device 20 for controlling the supply of electrical energy to compressor 14 from a source 21. A temperature responsive switch means 22 is connected in the control circuit.

Figure 2:
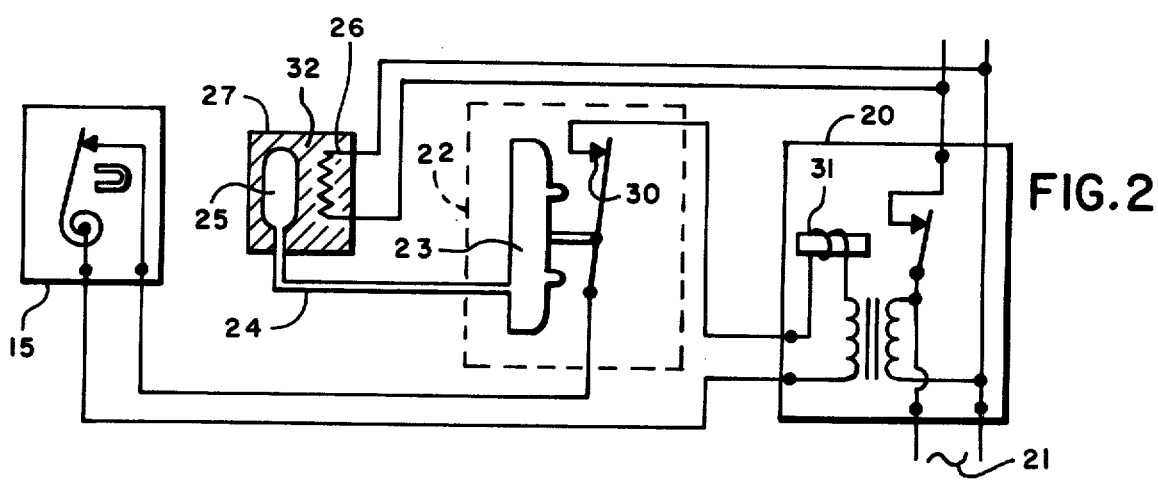
FIG. 2 is a specific showing of the electrical control circuit.

Specifically, the electrical control circuit is shown in FIG. 2. Switch 22 has a liquid filled diaphragm actuator 23 connected by a capillary 24 to a remote bulb or ambient temperature responsive element or temperature responsive portion 25 whereby upon the temperature of bulb 25 exceeding some predetermined temperature, switch 30 opens to break the control circuit between the thermostat and the relay or contactor 31 in device 20. An electrical heater 26 is connected in parallel with the energization circuit of compressor 14. The heater is mounted adjacent to bulb 25 to artifically heat the bulb and modify or reset the control point of the temperature responsive switch 22. The bulb 25 and heater 26 may be contained in an enclosure 27 and positioned to be exposed to not only the outdoor temperature but other temperature conditions such as solar heat and wind conditions which have a direct bearing upon the cooling load of the dwelling.

Figure 3:
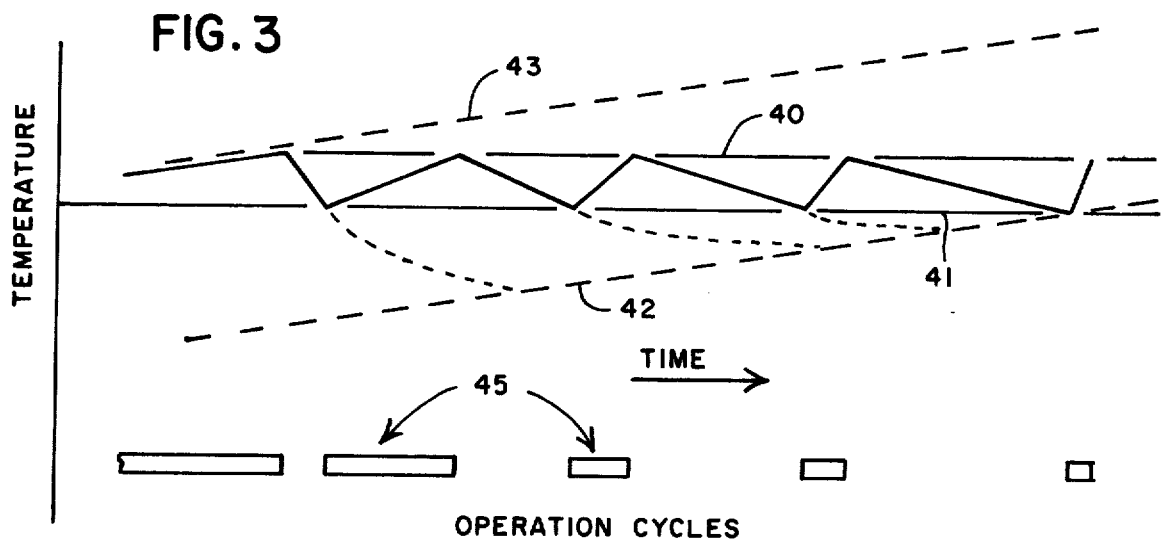
FIG. 3 is a graphical representation of the operation of the control device as applied in the load shedding system.

During the normal operation of the refrigeration apparatus, upon a call for cooling by thermostat 15, the control circuit is closed to energize relay 31 and connect compressor 14 to the source 21. As the compressor is energized and heater 26 is energized, a means to reset or modify the control temperature of switch 22 is provided. At some predetermined temperature, switch 30 opens to de-energize relay 31 and the compressor for a time depending upon how long it takes for bulb 25 to cool back to a cut-in temperature of the switch 22. Referring to FIG. 3, the cut-out temperature and cut-in temperature of switch 22 is shown by the horizontal lines 40 and 41. The temperature of bulb 25 depends upon the outdoor temperature and other temperature factors, such as solar heating, wind conditions and other factors affecting the cooling load of the building and operation of the apparatus, as shown in line 42 and the added heat of heater 26 which determines the temperature of the enclosure 27 and bulb 25 as shown in line 43. As the bulb temperature rises above the cut-off temperature, the refrigeration apparatus is de-energized. The temperature of the bulb then decreases to the cut-in temperature, and the refrigeration apparatus is again energized after a short cooling period. The rate of heating and cooling of bulb 25, and therefore the cycling rate of the refrigeration apparatus, can be changed by adding insulation or thermal mass 32 within the enclosure 27.

As the outdoor temperature increases and the effect of the heater 26 increases, the time needed for heating bulb 25 above the cut-off temperature is decreased to bring about shorter cycles or periods 45 of the operation of the refrigeration apparatus and thus cut down the demand for electrical energy. The percentage of operating time decreases as the outdoor temperature and other conditions affecting the air conditioning load increases. As the outdoor temperature increases, the actual operation of the refrigeration apparatus is reduced below that of a normal mode of operation by shorter "on" operation periods, shown by shorter segments 45.

The present control device can be installed on a refrigeration compressor by the original equipment manufacturer and installed in a manner to operate and reset or modify the control point of the device as the refrigeration apparatus operates. By such a load shedding device, a refrigeration apparatus used for a dwelling has a reduced percent of operation as the outdoor temperature increases from the desired or normal type of operation resulting in a shedding of electrical load and the conservation of electrical energy.

The embodiments of the invention in which an exclusive property or right is claimed are defined as follows:

1. A control device for selectively disconnecting an electrical temperature conditioning load apparatus from a source of electrical energy to reduce the use of energy by the apparatus as the temperature conditioning load increases, comprising temperature responsive means adapted to be responsive to outdoor temperature, the magnitude of which determines the electrical load of the apparatus as upon an increase in the level of said outdoor temperature the use of electrical energy from the source by the electrical load apparatus increases, control means connected to said temperature responsive means, said control means being adapted to terminate the operation of the electrical load apparatus when the temperature reaches a predetermined value, and means connected to affect the output of said temperature responsive means to reset said control means depending upon the operation of the electrical load apparatus to terminate the operation of the electrical load apparatus at a different value of the outdoor temperature whereby as the electrical load apparatus operates a larger percentage of time due to a change in said outdoor temperature, said last mentioned means being affected when electrical load apparatus is energized.

2. A control device adapted for use with an electrical energized motor driven compressor of a refrigeration system in which the load of the refrigeration system changes with outdoor temperature, the device reducing the operation of said motor driven compressor at higher outdoor temperatures to conserve energy, comprising, temperature responsive switch means adapted to be connected in the electrical control circuit of the motor driven compressor, said temperature responsive switch means having a temperature responsive portion adapted to respond to outdoor temperature conditions for opening said switch means and the energization circuit of the motor when an outdoor air temperature exceeds a predetermined value, and electrical heater means connected to said temperature responsive portion to change the control temperature of said switch means to open said switch means at a higher predetermined temperature, said heater means being adapted to be connected to be energized when the motor driven compressor is energized.

3. A control device adapted for use with an electrical load apparatus to reduce the use of electrical energy from a source as the demand for electrical energy by the apparatus increases, comprising, outdoor temperature condition responsive switch means having a predetermined temperature at which a switch is opened, said switch means is adapted to be connected in a control circuit of the electrical load apparatus to override a normal control of the apparatus, and heater means connected to said outdoor temperature responsive means changing the predetermined temperature at which said switch is opened, said heater means being adapted to be energized as a function of the operation of the electrical load apparatus whereby as the electrical load apparatus operates a greater percentage of the total time said outdoor temperature responsive switch means operates at a different predetermined temperature and thus reduces the use of electrical energy.

* * * * *